US010195830B2

(12) United States Patent
Miyake

(10) Patent No.: US 10,195,830 B2
(45) Date of Patent: Feb. 5, 2019

(54) DECORATIVE PANEL FOR EXTERIOR USE, AND METHOD FOR MANUFACTURING SAME

(71) Applicant: Dai Nippon Printing Co., Ltd., Tokyo (JP)

(72) Inventor: Katsuhiro Miyake, Aiko-Gun (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/561,117

(22) PCT Filed: Mar. 30, 2016

(86) PCT No.: PCT/JP2016/060292
§ 371 (c)(1),
(2) Date: Sep. 25, 2017

(87) PCT Pub. No.: WO2016/159036
PCT Pub. Date: Oct. 6, 2016

(65) Prior Publication Data
US 2018/0126710 A1 May 10, 2018

(30) Foreign Application Priority Data
Mar. 31, 2015 (JP) ................. 2015-073269

(51) Int. Cl.
B32B 27/18 (2006.01)
B32B 27/30 (2006.01)
(Continued)

(52) U.S. Cl.
CPC ............. B32B 27/18 (2013.01); B32B 27/30 (2013.01); C09D 5/28 (2013.01); C23C 4/02 (2013.01);
(Continued)

(58) Field of Classification Search
CPC ............ B41M 3/148; Y10T 428/24868; Y10T 428/1486; B32B 27/18
See application file for complete search history.

(56) References Cited

U.S. PATENT DOCUMENTS 6,322,875 B1* 11/2001 Kimura .................... B44F 1/14
428/195.1
2003/0205895 A1* 11/2003 Scarbrough ............ B41M 3/148
283/91
(Continued)

FOREIGN PATENT DOCUMENTS

JP 2004-090319 A1 3/2004
JP 2007-276346 A1 10/2007
(Continued)

OTHER PUBLICATIONS

International Search Report and Written Opinion (Application No. PCT/JP2016/060292) dated Jun. 28, 2016.
(Continued)

Primary Examiner — Betelhem Shewareged
(74) Attorney, Agent, or Firm — Burr & Brown, PLLC

(57) ABSTRACT

The purpose of the present invention is to provide a decorative panel which, while having weather resistance, exhibits an excellent gloss-matte effect through relative gloss differences, and can present tone gradations in surface gloss areas. A decorative panel has at least a surface coat layer, and a surface printing layer that is provided to part of the surface, said layers being laminated in the stated order on a heat-resistant substrate, wherein the surface coat layer is formed to a thickness of 5 μm or greater from a resin composition that contains a fluororesin and a delustering agent, the gloss value of the surface printing layer (at a light incidence angle of 60°) being 10 or less, and the gloss value of the surface printing layer (at a light incidence angle of 60°) being higher
(Continued)

by 10 or greater than the gloss value of the surface coat layer surface (at a light incidence angle of 60°).

12 Claims, 1 Drawing Sheet

(51) Int. Cl.
  *C09D 5/28* (2006.01)
  *C23C 4/02* (2006.01)
  *C23C 28/00* (2006.01)
  *C23C 28/02* (2006.01)
  *B41M 3/14* (2006.01)

(52) U.S. Cl.
  CPC ............ *C23C 28/00* (2013.01); *C23C 28/021* (2013.01); *C23C 28/023* (2013.01); *B32B 2307/40* (2013.01); *B32B 2307/712* (2013.01); *B41M 3/148* (2013.01); *Y10T 428/1486* (2015.01); *Y10T 428/24868* (2015.01)

(56) References Cited

U.S. PATENT DOCUMENTS

| 2012/0301639 A1* | 11/2012 | Grigorenko | B41M 3/148 |
| | | | 428/29 |
| 2014/0042900 A1* | 2/2014 | Hotta | H01L 33/60 |
| | | | 313/512 |

FOREIGN PATENT DOCUMENTS

| JP | 2008-007709 A1 | 1/2008 |
| JP | 2008-120031 A1 | 5/2008 |
| JP | 2012-210741 A1 | 11/2012 |
| JP | 2013-018231 A1 | 1/2013 |
| JP | 2014-184726 A1 | 10/2014 |

OTHER PUBLICATIONS

Extended European Search Report (Application No. 16772917.7) dated Sep. 19, 2018.

* cited by examiner

DECORATIVE PANEL FOR EXTERIOR USE, AND METHOD FOR MANUFACTURING SAME

TECHNICAL FIELD

The present invention relates to a decorative panel which, while having weather resistance, exhibits a gloss-matte effect of clearly expressing a relative gloss difference between a high-gloss section (surface gloss region) and a low-gloss section (surface matte region) provided on a surface, and is capable of presenting tone gradations in the surface gloss region, and a method for manufacturing the decorative panel.

BACKGROUND ART

Heretofore, decorative panels for imparting design property have been used for interiors and exteriors of buildings, interiors and exteriors of vehicles such as automobiles, housing materials for electrical products, and surface materials for furniture etc. In recent years, decorative panels having various design effects have been proposed as improvement of design property of decorative panels has been increasingly desired.

For example, Patent Document 1 discloses a decorative panel in which a predominant-color layer, a transparent resin layer, and a partially provided printing layer containing resin beads are laminated on a base material. In the decorative panel in Patent Document 1, two or more resin beads having different particle size distributions are incorporated in the printing layer to exhibit a so-called gloss-matte effect.

If in a decorative panel, not only a gloss-matte effect can be exhibited, but also tone gradations representing gray scales of a pattern can be presented in a surface gloss region and/or a surface matte region, it is expected that there can be provided a decorative panel which is novel and has high design property, leading to improvement of the consumer satisfaction level. However, when merely a printing layer containing two or more resin beads having different particle size distributions is provided on the outermost surface as in Patent Document 1, tone gradations as described above cannot be presented, there is still room for improvement for further improving design property.

PRIOR ART DOCUMENT

Patent Document

Patent Document 1: Japanese Patent Laid-open Publication No. 2007-276346

SUMMARY OF THE INVENTION

Problems to be Solved by the Invention

A decorative panel may be required to have weather resistance depending on a use of the decorative panel. Particularly a decorative panel to be used in exterior applications is required to have high weather resistance. Thus, development of a decorative panel having not only excellent design property but also high weather resistance is desired. For the decorative panel to have weather resistance, it is effective that a coating layer containing a fluororesin having weather resistance is provided in a relatively large thickness of 5 μm or more in the decorative panel, but a technique has not been previously known which ensures that a decorative panel provided with a coating layer of a fluororesin having a large thickness as described above presents tone gradations in a surface gloss region and/or a surface matte region while exhibiting a gloss-matte effect through a relative gloss difference.

An object of the present invention is to provide a decorative panel which, while having weather resistance, exhibits an excellent gloss-matte effect through a relative gloss difference, and is capable of presenting tone gradations in a surface gloss region.

Means for Solving the Problem

The present inventor has extensively conducted studies for solving the above-described problems, and resultantly found that when in a decorative panel in which at least a surface coating layer and a partially provided surface printing layer are laminated in this order on a heat-resistant substrate, the surface coating layer is formed in a thickness of 5 μm or more from a resin composition containing a fluororesin and a delustering agent, the surface of the surface coating layer has a gloss value of 10 or less (at a light incidence angle of 60°), and the surface of the surface printing layer has a gloss value (at a light incidence angle of 60°) higher by 10 or more than the gloss value of the surface of the surface coating layer (at a light incidence angle of 60°), the decorative panel exhibits an excellent gloss-matte effect through a relative gloss difference, and is capable of presenting tone gradations in a surface gloss region while having weather resistance. The present invention has been completed by further conducting studies on the basis of the above-mentioned finding.

The present invention provides inventions of aspects as listed below.

Item 1. A decorative panel in which at least a surface coating layer and a partially provided surface printing layer are laminated in this order on a heat-resistant substrate, wherein the surface coating layer is formed from a resin composition containing a fluororesin and a delustering agent, and has a thickness of 5 μm or more, and the surface of the surface coating layer has a gloss value of 10 or less (at a light incidence angle of 60°), and the surface of the surface printing layer has a gloss value (at a light incidence angle of 60°) higher by 10 or more than the gloss value of the surface of the surface coating layer (at a light incidence angle of 60°).

Item 2. The decorative panel according to item 1, wherein the surface of the surface printing layer has a center line average roughness of 1.5 μm or less.

Item 3. The decorative panel according to item 1 or 2, wherein the surface printing layer contains a lustrous pigment.

Item 4. The decorative panel according to any one of items 1 to 3, wherein the content of the lustrous pigment in the surface printing layer is 1.5 to 30% by mass.

Item 5. The decorative panel according to any one of items 1 to 4, wherein the delustering agent includes inorganic particles.

Item 6. The decorative panel according to any one of items 1 to 5, wherein the delustering agent has an average particle size of 5 μm or less.

Item 7. The decorative panel according to any one of items 1 to 6, wherein the surface of the surface printing layer has a gloss value of 15 or more (at a light incidence angle of 60°).

Item 8. The decorative panel according to any one of items 1 to 7, wherein a colored or transparent base coating layer is provided between the heat-resistant substrate and the surface coating layer.

Item 9. The decorative panel according to any one of items 1 to 8, wherein a pattern layer is provided between the heat-resistant substrate and the surface coating layer.

Item 10. The decorative panel according to item 9, wherein a pattern layer is provided between the base coating layer and the surface coating layer.

Item 11. The decorative panel according to any one of items 1 to 10, wherein a primer layer is provided between the heat-resistant substrate and the surface coating layer in such a manner that the primer layer is in contact with the heat-resistant substrate.

Item 12. A method for manufacturing a decorative panel, the method including the steps of: forming a surface coating layer on a heat-resistant substrate using a resin composition containing a fluororesin and a delustering agent, the surface coating layer having a thickness of 5 µm or more and a surface gloss value of 10 or less (at a light incidence angle of 60°); and partially forming a surface printing layer on the surface coating layer formed in the foregoing step, the surface printing layer having a surface gloss value (at a light incidence angle of 60°) higher by 10 or more than the surface gloss value of the surface coating layer (at a light incidence angle of 60°).

Advantages of the Invention

A decorative panel according to the present invention includes a surface coating layer containing a fluororesin and having a thickness of 5 µm or more, and thus has excellent weather resistance which makes the decorative panel applicable for exterior use.

In the decorative panel according to the present invention, the surface of the surface coating layer containing a fluororesin has a gloss value of 10 or less (at an light incidence angle of 60°) of 10 or less, and the surface of the surface coating layer has a gloss value (at a light incidence angle of 60°) higher by 10 or more than the gloss value (at an light incidence angle of 60°) of the surface of a printing layer partially provided on the surface coating layer, and thus a relative gloss difference between a high-gloss section (surface gloss region) and a low-gloss section (surface matte region) is clearly presented on the surface, so that an excellent gloss-matte effect is exhibited. The decorative panel according to the present invention can attain novel and excellent design property along with the gloss-matte effect because tone gradations can be presented in the surface gloss region, and particularly, even a weak tone gradation can be clearly visibly presented.

EMBODIMENTS OF THE INVENTION

In the present invention, the "tone gradation" refers to a gray scale of a pattern expressed by changing the size and/or density of dots to be printed.

A decorative panel according to the present invention is an decorative panel in which at least a surface coating layer and a partially provided surface printing layer are laminated in this order on a heat-resistant substrate, wherein the surface coating layer is formed from a resin composition containing a fluororesin and a delustering agent, and has a thickness of 5 µm or more, the surface of the surface coating layer has a gloss value of 10 or less (at a light incidence angle of 60°), and the surface of the surface printing layer has a gloss value (at a light incidence angle of 60°) higher by 10 or more than the gloss value of the surface of the surface coating layer (at a light incidence angle of 60°). Hereinafter, the decorative panel according to the present invention will be described in detail.

Laminated Structure of Decorative Panel

Figure 1:
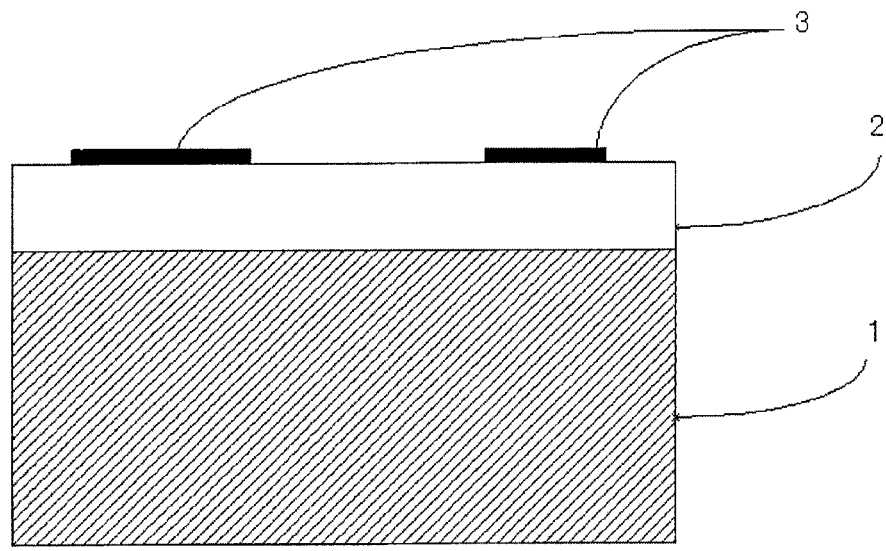
FIG. 1 is a schematic sectional view of one example of a decorative sheet according to the present invention.

The decorative panel according to the present invention has a laminated structure in which at least a surface coating layer 2 and a partially provided surface printing layer 3 are laminated in this order on a heat-resistant substrate 1 as shown in FIG. 1.

The decorative panel according to the present invention may have a primer layer 4 provided between the heat-resistant substrate 1 and the surface coating layer 2 as necessary for improving bondability between the heat-resistant substrate 1 and each layer disposed above the heat-resistant substrate 1. The primer layer may be provided between the heat-resistant substrate 1 and the surface coating layer 2 in such a manner that the primer layer is in contact with the heat-resistant substrate 1.

The decorative panel according to the present invention may have a colored or transparent base coating layer 5 provided between the heat-resistant substrate 1 and the surface coating layer as necessary for improving design property. When the primer layer 4 and the base coating layer 5 are provided, the heat-resistant substrate 1, the primer layer 4, the base coating layer 5 and the surface coating layer 2 may be laminated in this order.

The decorative panel according to the present invention may have a pattern layer 6 provided between the heat-resistant substrate 1 and the surface coating layer 2 as necessary for improving design property by imparting a pattern. When the base coating layer 5 is provided, the pattern layer 6 is disposed between the base coating layer 5 and the first surface layer 2, and when the base coating layer 5 is not provided, and the primer layer 4 is provided, the pattern layer 6 is disposed between the primer layer 4 and the surface coating layer 2.

Figure 2:
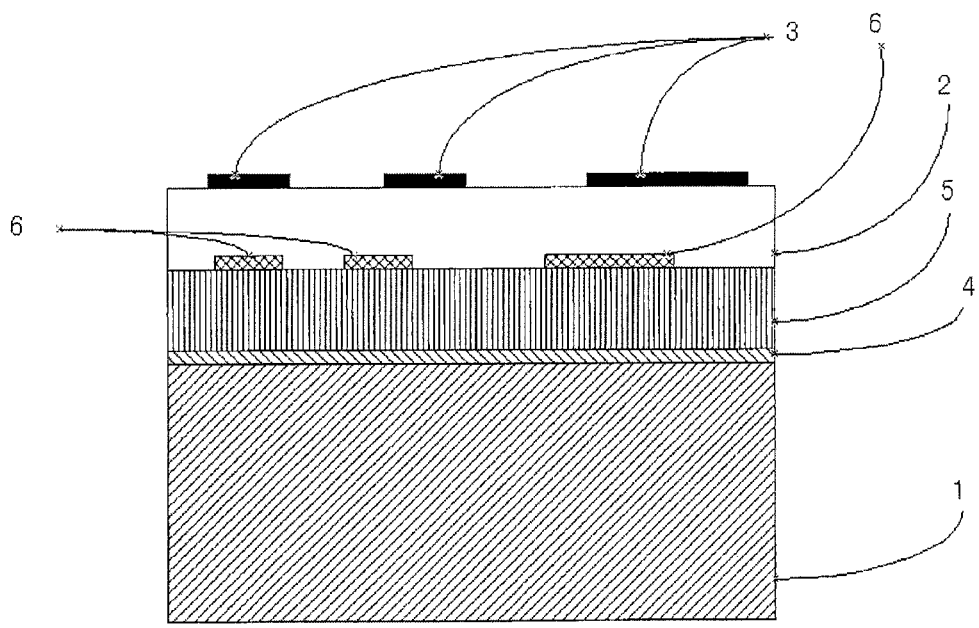
FIG. 2 is a schematic sectional view of one example of a decorative sheet according to the present invention.

FIG. 2 shows a schematic sectional view of a decorative panel in which the heat-resistant substrate 1, the primer layer 4, the base coating layer 5, the pattern layer 6, the surface coating layer 2 and the surface printing layer 3 are laminated in this order as one aspect of the laminated structure of the decorative panel according to the present invention.

Compositions of Layers Forming Decorative Panel

[Heat-Resistant Substrate 1]

The heat-resistant substrate 1 serves as a support member in the decorative panel according to the present invention. Here, the "heat-resistant substrate" refers to a substrate having heat resistance which ensures that the substrate can withstand baking in formation of the later-described surface coating layer 2 and surface printing layer 3, specifically a substrate which is not thermally denatured (degraded or denatured due to heat) even when exposed for 5 minutes to a temperature condition of 230° C., preferably 260° C.

Specific examples of the heat-resistant substrate 1 include metal plates such as steel plates, aluminum plates, duralumin plates and stainless steel plates; inorganic non-metal-based plates such as gypsum plates, calcium silicate plates, glass plates and cement plates; and woody plates such as single plates, joined plates, laminated materials, particle boards and MDFs (medium-density fiber plates) of wood. Among these heat-resistant substrates, metal plates are preferable.

When a metal plate is used as the heat-resistant substrate 1, the metal plate may be plated with one or more of zinc, tin, aluminum, copper, chromium and nickel for imparting rust-prevention property etc. Examples of the plating of two or more metals include alloy platings of iron and zinc, and alloy platings of aluminum, zinc and magnesium. Specific examples of the plated metal plate include electrogalvanized steel plates, alloy-molten galvanized steel plates, molten galvanized steel plates, aluminum-alloy-molten galvanized steel plates, alloy electroplated steel plates and damping steel plates. The heat-resistant substrate 1 may be subjected to chemical conversion treatment with chromic acid, zinc phosphate or the like as necessary for imparting corrosion resistance, adhesion and so on to the heat-resistant substrate 1.

The thickness of the heat-resistant substrate 1 is not particularly limited, and may be appropriately set according to the material of the heat-resistant substrate 1, a use of the decorative panel, and so on. The thickness of the heat-resistant substrate 1 is, for example, 0.3 to 5 mm, preferably 0.4 to 3 mm.

[Surface Coating Layer 2]

The surface coating layer 2 is provided on the heat-resistant substrate 1, and serves to impart weather resistance to the decorative panel according to the present invention. A region of the surface coating layer 2 on which the surface printing layer 3 (surface gloss region) is not provided forms a surface matte region while forming a part of the outermost surface layer of the decorative panel according to the present invention, expresses a relatively low gloss, and contributes to exhibition a gloss-matte effect together with the surface printing layer 3. The surface coating layer 2 also serves as a base for making it possible to present tone gradations by the surface printing layer 3.

The surface coating layer 2 is formed from a resin composition containing a fluororesin and a delustering agent. Excellent weather resistance is imparted by the fluororesin, and a low-gloss feeling is imparted by the delustering agent in the surface coating layer 2.

The kind of the fluororesin to be used for formation of the surface coating layer 2 is not particularly limited, and the fluororesin may be a curable fluororesin or a thermoplastic fluororesin, but is preferably a curable fluororesin.

The curable fluororesin may be a heat-curable fluororesin, an ionizing radiation-curable fluororesin or two-liquid-curable fluororesin, but is preferably a heat-curable fluororesin.

Specific examples of the curable fluororesin include fluororesins into which a crosslinkable reaction group is introduced. The kind of the fluororesin into which a crosslinkable reaction group is introduced is not particularly limited, and examples thereof include polyvinylidene fluoride, ethylene tetrafluoride resins, ethylene tetrafluoride-perfluoroalkoxy vinyl ether copolymers, ethylene tetrafluoride-propylene hexafluoride copolymers, polychlorotrifluoroethylene, ethylene tetrafluoride-ethylene copolymers, chlorotrifluoroethylene-ethylene copolymers and polyvinyl fluoride. The kind of the crosslinkable reaction group to be introduced into the fluororesin is not particularly limited, and examples thereof include a carboxyl group, a glycidyl group, an amide group, an amino group, a mercapto group, a sulfo group, an isocyanate group, a hydroxyl group, and an active halogen atom (bromine, iodine and the like).

The curable fluororesin is manufactured by a known method, and is also commercially available, and therefore in the present invention, a curable fluororesin which is manufactured by a known method or which is commercially available may be used as the curable fluororesin.

In formation of the surface coating layer 2, one fluororesin may be used singly, or two or more fluororesins may be used in combination.

The surface coating layer 2 may contain another resin in addition to the fluororesin as necessary within the bounds of not impairing the effect of the present invention. Such a resin is not particularly limited, and examples thereof include thermoplastic resins such as (meth)acrylic resins, polyurethane resins, polyester resins, polyamide resins, (meth) acrylic acid ester-olefin copolymer resins, vinyl chloride acetate resins, ethylene-vinyl acetate copolymer resins (EVA resins), ionomer resins and olefin-α olefin copolymer resins, epoxy resins, phenol resins, urea resins, unsaturated polyester resins, melamine resins, alkyd resins, polyimide resins, silicone resins, hydroxyl group-functional acrylic resins, carboxyl-functional acrylic resins, amide-functional copolymers, and urethane resins. These resins may be used singly, or in combination of two or more thereof.

The content of the fluororesin in the surface coating layer 2 may be appropriately set as long as the later-described gloss value (at a light incidence angle of 60°), but the content of the fluororesin is, for example, 50 to 95% by mass, preferably 60 to 95% by mass.

The kind of the delustering agent to be used for formation of the surface coating layer 2 is not particularly limited, and examples thereof include inorganic particles such as particles of silica, clay, heavy calcium carbonate, light calcium carbonate, sedimentary barium sulfate, calcium silicate, synthetic silicates and silicic acid fine powder; and resin particles such as particles of acrylic resins, urethane resins, nylon resins, polypropylene resins and urea-based resins. These delustering agents may be used singly, or in combination of two or more thereof. Among these delustering agents, acrylic resin particles, silica particles are preferable, and silica particles are more preferable for further improving the gloss-matte effect and the tone gradation presenting effect.

The average particle size of the delustering agent to be used for formation of the surface coating layer 2 is not particularly limited as long as the later-described gloss value (at a light incidence angle of 60°) is attained, but the average particle size of the delustering agent is normally 5 μm or less, preferably 2 μm or less, more preferably 1 or less for further improving the gloss-matte effect and the tone gradation presenting effect. The lower limit of the average particle size of the delustering agent is not particularly limited as long as a desired delustering effect can be attained, but the lower limit of the average particle size of the delustering agent is, for example, 0.1 μm or more. Here, the average particle size of the delustering agent is a volume cumulative particle size $D_{50}$ (particle size at a 50% cumulative volume) as measured by a laser diffraction scattering type particle size distribution measurement method.

The content of the delustering agent in the surface coating layer 2 may be appropriately set according to the gloss value to be attained, the kinds of the fluororesin and delustering agent to be used, and so on, but the content of the delustering agent is, for example, 5 to 50% by mass. Particularly when silica particles are used as the delustering agent, the content of the delustering agent is, for example, 6 to 15% by mass, preferably 8 to 10% by mass.

When in the surface coating layer 2, a curable resin such as a curable fluororesin is used, a curing agent may be contained. The kind of the curing agent may be appropriately selected according to the kind of the crosslinkable reaction group introduced in the curable fluororesin, and examples thereof include isocyanate-based curing agents, melamine resins, amino resins, carbodiimide, pyridine-based curing agents and phosphine-based curing agents. The content of the curing agent may be appropriately set according to the valence of the crosslinkable reaction group in the curable fluororesin.

In addition to the foregoing components, various kinds of additives may be blended in the surface coating layer 2 according to desired properties to be imparted. Examples of these additives include ultraviolet absorbers, weather resistance improving agents such as light stabilizers, abrasion resistance improving agents, polymerization inhibitors, infrared absorbers, antistatic agents, bondability improving agents, leveling agents, thixotropy-imparting agents, coupling agents, plasticizers, antifoaming agents, fillers, solvents and colorants. These additives can be appropriately selected from those that are commonly used.

The gloss value of the surface of the surface coating layer 2 (at a light incidence angle of 60°) is set to 10 or less. When the gloss value of the surface of the surface coating layer 2 (at a light incidence angle of 60°) is 10 or less, and lower than the gloss value of the surface of the surface printing layer 3, the surface coating layer 2 can attain an excellent gloss-matte effect, and serve as a base for making it possible to present tone gradations by the surface printing layer 3. For further improving the gloss-matte effect and the tone gradation presenting effect, the gloss value of the surface of the surface coating layer 2 (at a light incidence angle of 60°) is preferably 2 to 10, more preferably 4 to 8. Here, the "gloss value of the surface of the surface coating layer 2 (at a light incidence angle of 60°)" is a gloss value (glossiness) that is measured while a region of the surface coating layer 2, which is not provided with the surface printing layer 3, in the decorative panel according to the present invention is irradiated with light at a light incidence angle of 60° using a gloss meter. For controlling the gloss value of the surface coating layer 2 (at a light incidence angle of 60°) to fall within the above-mentioned range, for example, the particle size, the kind and the addition amount of the delustering agent to be used, the thickness of the surface coating layer 2, the coating method during formation of the surface coating layer 2, and so on may be appropriately adjusted.

The center line average roughness (Ra) of the surface of the surface coating layer 2 is not particularly limited, but it is preferably 1.5 μm or less, more preferably 1.0 μm or less, especially preferably 0.8 μm or less for further improving the gloss-matte effect and the tone gradation presenting effect. The lower limit of the center line average roughness (Ra) of the surface of the surface coating layer 2 is not particularly limited, but it is, for example, 0.1 μm or more, preferably 0.2 μm or more. Here, the "center line average roughness (Ra) of the surface of the surface coating layer 2" is a value obtained by making a measurement using a surface roughness measurement device for a region of the surface coating layer 2, which is not provided with the surface printing layer 3 in the decorative panel according to the present invention. For controlling the center line average roughness (Ra) of the surface of the surface coating layer 2 to fall within the above-mentioned range, for example, the particle size, the kind and the addition amount of the delustering agent to be used, the thickness of the surface coating layer 2, the coating method during formation of the surface coating layer 2, and so on may be appropriately adjusted.

The thickness of the surface coating layer 2 is set to 5 μm or more. By providing the surface coating layer 2 in such a thickness, excellent weather resistance can be imparted. For further improving weather resistance, the thickness of the surface coating layer 2 is preferably 10 to 40 μm, more preferably 15 to 40 μm.

[Surface Printing Layer 3]

The surface printing layer 3 is partially provided on the surface coating layer 2, forms a surface matte region while forming a part of the outermost surface layer of the decorative panel according to the present invention, expresses a relatively high gloss, and contributes to a gloss-matte effect together with the surface coating layer 2. The surface printing layer 3 can exhibit a design effect of presenting a tone gradation expression when the surface coating layer 2 is used as a base.

The surface printing layer 3 may be partially provided on the surface coating layer 2. For example, the surface printing layer 3 may be provided so as to form a pattern on the surface coating layer 2. The pattern that is formed by the surface printing layer 3 is not particularly limited, and examples thereof include woodgrain patterns, stone grain patterns imitating the surface of stone and rock, such as marble patterns (e.g. travertine marble patterns), fabric patterns imitating textures and cloth patterns, tiling patterns, brick masonry patterns, leather drawing patterns, geometric graphics, characters, symbols and various kinds of abstract patterns. When a pattern is formed by the surface printing layer 3 as described above, the pattern can be expressed with a relatively high gloss.

When the later-described pattern layer 6 is provided, further excellent design property can be imparted by providing the surface printing layer 3 so as to follow a pattern from the pattern layer. For example, by forming a pattern from the surface printing layer 3 so as to follow a light-color section of the pattern layer 6, the light-color section can be emphasized.

By partially changing a dot area ratio within the surface printing layer 3, a pattern with gray scales can be finely presented. Here, the dot area ratio is a ratio occupied by the area of dots per unit area of the base. The tone gradation becomes more intense as the dot area ratio increases, and the tone gradation becomes weaker as the dot area ratio decreases. In the surface printing layer 3, the pattern can be clearly visibly presented even in a weak tone gradation with a dot area ratio of 20%, and therefore a pattern formed by the surface printing layer 3 can be given gray scales over a wide tone gradation region. The surface printing layer 3 may be printed in such a manner that in the surface printing layer 3, a section where a weaker tone gradation is to be presented is provided with dots so as to reduce the dot area ratio, and a section where a more intense tone gradation is to be presented is provided with dots so as to increase the dot area ratio. When the later-described pattern layer 6 is provided, a change in tone gradation as described above may be set so as to follow the pattern from the pattern layer.

The resin that forms the surface printing layer 3 may be a thermoplastic resin or a curable resin, and is not particularly limited as long as the later-described gloss value (at a light incidence angle of 60°) is attained. Specific examples of the resin that forms the surface printing layer 3 include thermoplastic resins such as fluororesins, (meth)acrylic resins, polyurethane resins, polyester resins, polyamide resins, (meth)acrylic acid ester-olefin copolymer resins, vinyl chloride acetate resins, ethylene-vinyl acetate copolymer resins (EVA resins), ionomer resins and olefin-α olefin copolymer resins; and curable resins such as fluororesins, epoxy resins, phenol resins, urea resins, polyester resins, melamine resins, alkyd resins, polyimide resins, silicone resins, hydroxyl group-functional acrylic resins, carboxyl-functional acrylic resins, amide-functional copolymers and urethane resins. Here, the curable resins include thermosetting resins, ionizing radiation-curable resins and two-liquid-curable resins. Among these resins, fluororesins are preferable, curable fluororesins are more preferable, and thermosetting fluororesins are especially preferable for further improving weather resistance, the gloss-matte effect and the tone gradation presenting effect.

When a fluororesin is used for formation of the surface printing layer 3, specific examples of the fluororesin that can be used, the preferred fluororesins, and so on are the same as in the case of the surface coating layer 2.

The surface printing layer 3 may contain a lustrous pigment for further improving the tone gradation presenting effect. Examples of the lustrous pigment include metallic pigments composed of scale-like foil pieces of aluminum, nickel, cobalt, brass, copper or the like; and pearl pigments composed of scale-like foil pieces of titanium dioxide-covered mica, basic lead carbonate, aluminum oxide or the like. These lustrous pigments may be used singly, or in combination of two or more thereof. The surface of the lustrous pigment may be subjected to a weather resistance imparting treatment as necessary for improving weather resistance.

When the lustrous pigment is to be incorporated in the surface printing layer 3, the content of the lustrous pigment may be appropriately set according to the gloss value to be attained (at a light incidence angle of 60°), the degree of the tone gradation pattern presenting effect, and so on, but the content of the lustrous pigment in the surface printing layer 3 is 1.5 to 30% by mass, preferably 6 to 25% by mass for efficiently attaining both the gloss-matte effect and the tone gradation presenting effect.

In addition to the foregoing components, various kinds of additives may be blended in the surface printing layer 3 according to desired properties to be imparted. Examples of these additives include ultraviolet absorbers, weather resistance improving agents such as light stabilizers, abrasion resistance improving agents, polymerization inhibitors, infrared absorbers, antistatic agents, bondability improving agents, leveling agents, thixotropy-imparting agents, coupling agents, plasticizers, antifoaming agents, fillers, solvents and colorants. When a curable resin is used for formation of the surface printing layer 3, a curing agent may be contained. These additives can be appropriately selected from those that are commonly used.

The gloss value of the surface of the surface printing layer 3 (at a light incidence angle of 60°) is set so as to be higher by 10 or more than the gloss value of the surface of the surface coating layer 2 (at a light incidence angle of 60°). When the surface printing layer 3 has a gloss value as described above, a tone gradation presenting effect can be exhibited together with an excellent gloss-matte effect. For further improving the gloss-matte effect and the tone gradation presenting effect, the gloss value of the surface of the surface printing layer 3 (at a light incidence angle of 60°) is preferably higher by 10 to 50, more preferably higher by 15 to 50 than the gloss value of the surface of the surface coating layer 2 (at a light incidence angle of 60°). Here, the "gloss value of the surface of the surface printing layer 3 (at a light incidence angle of 60°)" is a gloss value (glossiness) that is measured while a region which is provided with the surface printing layer 3 in the decorative panel according to the present invention is irradiated with light at a light incidence angle of 60° using a gloss meter.

The gloss value of the surface of the surface printing layer 3 (at a light incidence angle of 60°) may be set so as to be higher by 10 or more than the gloss value of the surface of the surface coating layer 2 (at a light incidence angle of 60°), but the gloss value of the surface of the surface printing layer 3 is specifically 15 or more, preferably 20 to 60. The gloss value of the surface of the surface printing layer 3 (at a light incidence angle of 60°) can be controlled by adjusting the kind and thickness of a resin to be used, the kinds and blending amounts of additives to be added as necessary, and so on.

The center line average roughness (Ra) of the surface of the surface printing layer 3 is not particularly limited, but it is 1.5 µm or less, more preferably 1.0 µm or less, especially preferably 0.8 µm or less for further improving the gloss-matte effect and the tone gradation presenting effect. The lower limit of the center line average roughness (Ra) of the surface of the surface printing layer 3 is not particularly limited, but it is, for example, 0.1 µm or more, preferably 0.2 µm or more. Here, the "center line average roughness (Ra) of the surface of the surface printing layer 3" is a value obtained by making a measurement using a surface roughness measurement device for the surface region of the surface printing layer 3. For controlling the center line average roughness (Ra) of the surface of the surface printing layer 3 to fall within the above-mentioned range, for example, the thickness of the surface printing layer 3, the printing method during formation of the surface printing layer 3, and so on may be appropriately adjusted.

The thickness of the surface printing layer 3 is normally 0.5 to 8 µm, preferably 1 to 1.5 µm.

[Primer Layer 4]

The primer layer 4 is a layer that is provided between the heat-resistant substrate 1 and the surface coating layer 2 as necessary for improving bondability between the heat-resistant substrate 1 and each layer disposed above the heat-resistant substrate 1. The primer layer 4 is disposed in contact with the heat-resistant substrate 1. When the later-described base coating layer 5 is provided, the primer layer 4 is disposed between the heat-resistant substrate 1 and the base coating layer 5.

The primer layer 4 is formed from a binder resin. The kind of the binder resin to be used for formation of the primer layer 4 is not particularly limited, and examples thereof include urethane resins, (meth)acrylic resins, (meth)acryl-urethane copolymer resins, vinyl chloride-vinyl acetate copolymers, polyester resins, butyral resins, chlorinated polypropylene, chlorinated polyethylene and epoxy resins. These binder resins may be used singly, or in combination of two or more thereof.

In addition to the binder resin, various kinds of additives may be blended in the primer layer 4 according to desired properties to be imparted. Examples of these additives include ultraviolet absorbers, weather resistance improving agents such as light stabilizers, abrasion resistance improving agents, polymerization inhibitors, curing agents, infrared absorbers, antistatic agents, bondability improving agents, leveling agents, thixotropy-imparting agents, coupling agents, plasticizers, antifoaming agents, fillers, solvents and colorants. These additives can be appropriately selected from those that are commonly used.

The thickness of the primer layer 4 is not particularly limited, but it is, for example, 0.5 to 8 µm, preferably 0.5 to 5 µm.

[Base Coating Layer 5]

The base coating layer 5 is a layer that is provided between the heat-resistant substrate 1 and the surface coating layer 2 as necessary for improving design property.

The base coating layer 5 is normally formed as a masking layer (opaque layer), and plays a role of masking the heat-resistant substrate 1 and imparting an intended color, but the base coating layer 5 may be formed as a semi-transparent or transparent layer to make use of a pattern and a color of the heat-resistant substrate 1.

The base coating layer 5 is formed using a resin. The kind of the resin to be used for formation of the base coating layer 5 is not particularly limited, and specific examples of thereof include thermoplastic resins such as (meth)acrylic resins, polyurethane resins, polyester resins, polyamide resins, (meth)acrylic acid ester-olefin copolymer resins, vinyl chloride acetate resins, ethylene-vinyl acetate copolymer resins (EVA resins), ionomer resins and olefin-α olefin copolymer resins; and curable resins such as fluororesins, epoxy resins, phenol resins, urea resins, polyester resins, melamine resins, alkyd resins, polyimide resins, silicone resins, hydroxyl group-functional acrylic resins, carboxyl-functional acrylic resins, amide-functional copolymers and urethane resins. Here, the curable resins include thermosetting resins, ionizing radiation-curable resins and two-liquid-curable resins. Among these resins, fluororesins are preferable, curable fluororesins are more preferable, and thermosetting fluororesins are especially preferable for imparting further excellent weather resistance.

When a fluororesin is used as a resin that forms the base coating layer 5, specific examples of the fluororesin that can be used, the preferred fluororesins, and so on are the same as in the case of the surface coating layer 2.

When the base coating layer 5 is provided as a masking layer, the base coating layer 5 may contain a colorant such as a pigment or a dye together with the above-mentioned resin. The kind of the colorant to be blended in the base coating layer 5 is not particularly limited, and examples thereof include inorganic pigments such as carbon black (Indian ink), iron black, titanium white, antimony white, yellow lead, titanium yellow, iron red, cadmium red, ultramarine blue and cobalt blue; organic pigments or dyes such as quinacridone red, isoindolinone yellow and phthalocyanine blue; metallic pigments composed of scale-like foil pieces of aluminum, brass or the like; and pearl pigments composed of scale-like foil pieces of titanium dioxide-covered mica, basic lead carbonate or the like. These colorants may be used singly, or in combination of two or more thereof.

In addition to the foregoing components, various kinds of additives may be blended in the base coating layer 5 according to desired properties to be imparted. Examples of these additives include ultraviolet absorbers, weather resistance improving agents such as light stabilizers, abrasion resistance improving agents, polymerization inhibitors, infrared absorbers, antistatic agents, bondability improving agents, leveling agents, thixotropy-imparting agents, coupling agents, plasticizers, antifoaming agents, fillers and solvents. When a curable resin is used for formation of the base coating layer 5, a curing agent may be contained. These additives can be appropriately selected from those that are commonly used.

The thickness of the base coating layer 5 is not particularly limited, but it is, for example, 5 to 40 µm, preferably 10 to 30 µm.

[Pattern Layer 6]

The pattern layer 6 is a layer that is provided between the heat-resistant substrate 1 and the surface coating layer 2 as necessary for improving design property by a pattern. When the base coating layer 5 is provided, the pattern layer 6 is disposed between the base coating layer 5 and the surface coating layer 2, and when the base coating layer 5 is not provided, and the primer layer 4 is provided, the pattern layer 6 is disposed between the primer layer 4 and the surface coating layer 2. The pattern layer 6 is partially provided so as to form a desired pattern on a predetermined layer.

The pattern that is formed by the pattern layer 6 is not particularly limited, and examples thereof include woodgrain patterns, stone grain patterns imitating the surface of stone and rock, such as marble patterns (e.g. travertine marble patterns), fabric patterns imitating textures and cloth patterns, tiling patterns, brick masonry patterns, and patterns of wooden mosaics and patchworks. These patterns are formed by normal multicolor printing with process colors of yellow, red, blue and black, or formed by, for example, multicolor printing with spot colors which is performed using plates of individual colors for forming a pattern.

The pattern layer 6 is formed from an ink composition containing a binder resin and a colorant. Examples of the binder resin to be used for formation of the pattern layer 6 include fluororesins, (meth)acrylic resins, polyester resins, unsaturated polyester resins, urethane resins, polycarbonate resins, vinyl chloride-vinyl acetate copolymers, polyvinyl acetal resins and nitrocellulose resins. These binder resins may be used singly, or in combination of two or more thereof. Among these binder resins, fluororesins are preferable, and curable fluororesins are more preferable for imparting further excellent weather resistance.

When a fluororesin is used as a binder resin in the pattern layer 6, specific examples of the fluororesin that can be used, the preferred fluororesins, and so on are the same as in the case of the surface coating layer 2.

The kind of the colorant to be used for formation of the pattern layer 6 is not particularly limited, and the same colorant as shown as an example for the base coating layer 5 may be used.

The pattern layer 6 may contain, in addition to the binder resin and the colorant, an ultraviolet absorber, a weather resistance improving agent such as a light stabilizer, an infrared absorber, an antistatic agent, a bondability improving agent, a leveling agent, a thixotropy imparting agent, a coupling agent, a plasticizer, an antifoaming agent, a filler and so on as necessary. When a curable resin is used as a binder resin in the pattern layer 6, a curing agent may be contained. These additives can be appropriately selected from those that are commonly used.

The thickness of the pattern layer 6 is not particularly limited, but it is, for example, 0.5 to 8 µm, preferably 0.5 to 1.5 µm.

Uses of Decorative Panel

The decorative panel according to the present invention can be used as a surface decorative panel for a building member, a fixture, an interior or exterior member of a vehicle etc., and is suitable for an exterior member that is applied outdoors or semi-outdoors because the decorative panel has excellent weather resistance. Specific examples of the exterior member include surface decorative panels for building members for exteriors such as roofs, walls, floors, balcony blinders and ceilings (spaces under the eaves); surface decorative panels for fixtures for exteriors such as doors, window frames, handrails, rims and malls; and exterior materials for vehicles such as automobiles and trains.

Method for Manufacturing Decorative Panel

The method for manufacturing a decorative panel according to the present invention is not particularly limited as long as the decorative panel can have a layer structure and compositions of layers as described above, and one preferred example of the method will be described below.

When the primer layer 4 is provided, first the primer layer 4 is formed on the heat-resistant substrate 1. Specifically, the primer layer 4 is formed in the following manner: a primer layer coating liquid containing a binder resin and additives to be added as necessary is applied onto the heat-resistant substrate 1, and dried or cured. Examples of the method for applying a primer layer coating liquid onto the heat-resistant substrate 1 include coating methods such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, continuous-flowing coating, brushing and spray coating. When a thermosetting resin is used as a binder resin in the primer layer 4, the resin may be cured by performing baking after applying the primer layer coating liquid. Conditions for the baking may be appropriately set according to the kind of a binder resin to be used, etc., but for example, the baking is performed at 160 to 250° C., preferably 200 to 230° C. for 1 to 10 minutes, preferably 1 to 5 minutes.

When the base coating layer 5 is provided, the base coating layer 5 is formed on the heat-resistant substrate 1, or formed on the primer layer 4 if the primer layer 4 is provided. The base coating layer 5 is formed in the following manner: a base coating layer coating liquid containing a resin, and a colorant and other additives to be added as necessary is applied onto a predetermined layer, and dried or cured. The base coating layer coating liquid can be applied by a method similar to the method for applying the primer layer coating liquid. When a thermosetting resin is used as a resin contained in the base coating layer 5, the resin may be cured by performing baking after applying the base coating layer coating liquid. Conditions for the baking may be appropriately set according to the kind of a resin to be used, etc., but for example, the baking is performed at 160 to 260° C., preferably 180 to 200° C. for 1 to 10 minutes, preferably 1 to 5 minutes.

When the pattern layer 6 is provided, the pattern layer 6 is formed on the heat-resistant substrate 1, or formed on the primer layer 4 and/or the base coating layer 5 if the primer layer 4 and/or the base coating layer 5 are (is) provided. The pattern layer 6 is formed in the following manner: a pattern layer ink containing a binder resin, a colorant and other additives to be added as necessary is applied by a printer so as to form a desired pattern. The printing method may be any of rotary printing such as gravure printing, flexographic printing and silk screen printing, sheet printing and the like.

The surface coating layer 2 is formed on a laminated body in which the primer layer 4, the base coating layer 5 and the pattern layer 6 are thus laminated as necessary on the heat-resistant substrate 1. Specifically, the surface coating layer 2 is formed in the following manner: a surface coating layer coating liquid containing a fluororesin, and a lustrous pigment and other additives to be added as necessary is applied onto a predetermined layer, and dried or cured. The surface coating layer coating liquid can be applied by a method similar to the method for applying the primer layer coating liquid. When a thermosetting fluororesin is used in the surface coating layer 2, the resin may be cured by performing baking after applying the base coating layer coating liquid. Conditions for the baking may be appropriately set according to the kind of a fluororesin to be used, etc., but for example, the baking is performed at 210 to 260° C., preferably 220 to 230° C. for 1 to 10 minutes, preferably 1 to 5 minutes.

Then, the decorative panel according to the present invention is obtained by partially forming the surface printing layer 3 on the surface coating layer 2 formed on the heat-resistant substrate 1. The surface printing layer 3 is formed in the following manner: a surface printing layer ink containing a resin and other additives to be added as necessary is applied onto the surface coating layer 2 by a printer so as to form a desired pattern. The printing method may be a method which ensures that tone gradations can be presented, and the printing method may be any of, for example, rotary printing such as gravure printing, flexographic printing and silk screen printing, sheet printing and the like. Gravure printing is preferable for further effectively presenting tone gradations, and particularly, gravure offset printing is preferable from the viewpoint of printability to the heat-resistant substrate. When a thermosetting resin is used in the surface coating layer 2, the resin may be cured by performing baking after applying the surface printing layer ink. Conditions for the baking may be appropriately set according to the kind of a thermosetting resin to be used, etc., but for example, the baking is performed at 210 to 260° C., preferably 220 to 230° C. for 1 to 10 minutes, preferably 1 to 5 minutes.

EXAMPLES

The present invention will now be described further in detail by way of examples, but the present invention is in no way limited to these examples.

1. Manufacturing of Decorative Panel

A primer layer coating liquid as described below was applied onto a heat-resistant substrate composed of an electrogalvanized steel plate (thickness: 0.6 mm) by a bar coating method in such a manner that the thickness after baking would be 2 μm, and baking was then performed for 1.5 minutes under such a condition that the heat-resistant substrate had a surface temperature of 224° C., thereby forming a primer layer over the whole surface of the heat-resistant substrate.

(Primer Layer Coating Liquid)

A polyester-based primer paint was diluted with an organic solvent, and the resulting solution was used as a primer layer coating liquid.

The polyester-based primer paint contains a thermosetting polyester resin, a curing agent (melamine) and a rust inhibitor (zinc phosphate), and has a solid concentration of 42% by mass.

A base coating layer coating liquid as described below was then applied onto the thus-formed primer layer by a bar coating method in such a manner that the thickness after baking would be 18 μm, and baking was then performed for 1.5 minutes under such a condition that the heat-resistant substrate had a surface temperature of 188° C., thereby forming a base coating layer having shielding property over the whole surface of the heat-resistant substrate.

(Base Coating Layer Coating Liquid)

A fluorine-based colored (gray-colored) paint was diluted with a mixed solvent of xylene and toluene (mass ratio: 1:1), and the resulting solution was used as a base coating layer coating liquid.

The fluorine-based colored (gray-colored) paint contains a thermosetting fluororesin, a curing agent (isocyanate) and gray-colored pigment (titanium oxide and chromium oxide), and has a solid concentration of 40% by mass. The content of the colored pigment in the solid is 10% by mass.

A surface coating layer coating liquid as described below was then applied onto the thus-formed base coating layer by a bar coating method in such a manner that the thickness after baking would be a predetermined value as shown in Tables 1 to 3, and baking was then performed for 2 minutes under such a condition that the heat-resistant substrate had a surface temperature of 224° C., thereby forming a surface coating layer over the whole surface.

(Surface Coating Layer Coating Liquid)

A fluorine-based clear paint and a delustering agent as shown in Tables 1 to 3 were diluted with a mixed solvent of xylene and toluene (mass ratio: 1:1), and the resulting solution was used as a surface coating layer coating liquid.

The fluorine-based clear paint contains a thermosetting fluororesin and a curing agent (isocyanate), and has a solid concentration of 30% by mass. The fluorine-based clear paint does not contain a colorant.

A surface printing ink as described below was applied onto the thus-formed surface coating layer by gravure offset printing in such a manner that the thickness after baking would be 0.5 to 1.5 µm. Baking was then performed for 2 minutes for curing under such a condition that the heat-resistant substrate had a surface temperature of 224° C., thereby forming a surface printing layer. The surface printing layer is partially provided on the surface coating layer, and the outermost surface of the manufactured decorative panel is formed by a surface region of the surface printing layer and a surface region of the surface coating layer which is not provided with the surface printing layer. As a plate for printing, a tone gradation plate with tone gradations set stepwise in line with dot area ratios of 20%, 40%, 60%, 80% and 100% which are set at intervals of 2.5 mm. In the tone gradation plate, regions presenting dot area ratios of 20%, 40%, 60%, 80% and 100%, there are provided a cell having an opening length of 45 µm and a plate depth of 13 µm, a cell having an opening length of 90 µm and a plate depth of 26 µm, a cell having an opening length of 134 µm and a plate depth of 39 µm, a cell having an opening length of 179 µm and a plate depth of 52 µm, and a cell having an opening length of 224 µm and a plate depth of 65 µm, respectively. The cells each have a quadrangular pyramid shape.

(Surface Printing Ink)

A fluorine-based clear ink, a polyester-based clear ink or an acryl-based clear ink and a lustrous pigment as shown in Tables 1 to 3 were diluted with a mixed solvent of xylene and cyclohexanone (mass ratio: 1:1), and the resulting solution was used as a surface printing ink.

The fluorine-based clear ink contains a thermosetting fluororesin and a curing agent (isocyanate), and has a solid concentration of 32% by mass. The fluorine-based clear ink does not contain a colorant.

The polyester-based clear ink contains a thermosetting polyester resin and a curing agent (melamine), and has a solid concentration of 41% by mass. The polyester-based clear ink does not contain a colorant.

The acryl-based clear paint contains a thermosetting acrylic resin and a curing agent (isocyanate), and has a solid concentration of 45% by mass. The acryl-based clear ink does not contain a colorant.

2. Evaluation of Decorative Panel

The thus-obtained decorative panels were evaluated for the gloss value, the center line average roughness, the gloss-matte effect and the visibility of a presented pattern in accordance with the following methods.

<Gloss Value>

The gloss vales of the region of an exposed surface coating layer and the region of a surface printing layer in each decorative panel were measured under the condition of an incidence angle of 60° C. using a gloss meter ("VG 2000" manufactured by NIPPON DENSHOKU INDUSTRIES Co., LTD.).

<Center Line Average Roughness (Ra)>

For the region of an exposed surface coating layer and the region of a surface printing layer in each decorative panel, the center line average roughness Ra (µm) was measured using a surface roughness measurement instrument ("SURFCORDER SE-40C (Model)" manufactured by Kosaka Laboratory Ltd.).

<Gloss-Matte Effect>

Each decorative panel was visually observed, and the gloss-matte effect was evaluated in accordance with the following criteria.

(Criteria on Gloss-Matte Effect)

⊙: A gloss-matte effect through a relative gloss difference between the surface coating layer and the surface printing layer is markedly exhibited.

○: A gloss-matte effect through a relative gloss difference between the surface coating layer and the surface printing layer is exhibited.

Δ: A gloss-matte effect through a relative gloss difference between the surface coating layer and the surface printing layer is slightly exhibited.

x: A gloss-matte effect through a relative gloss difference between the surface coating layer and the surface printing layer is hardly exhibited.

<Visibility of Presented Tone Gradation>

Each decorative panel was visually observed, and the visibility of a presented tone gradation was evaluated in accordance with the following criteria.

(Criteria on Visibility of Presented Tone Gradation)

⊙: A weak tone gradation with a dot area ratio of 20% is very clearly presented.

○: A weak tone gradation with a dot area ratio of 20% is sufficiently presented although not as clear as the tone gradation rated as ⊙ above.

Δ: A weak tone gradation with a dot area ratio of 20% is slightly presented, and a difference in tone gradation between dot area ratios of 0% and 20% is only slightly visible.

x: A weak tone gradation with a dot area ratio of 20% is hardly presented, and a difference in tone gradation between dot area ratios of 0% and 20% is not visible.

The results of evaluating the decorative panels are shown in Tables 1 to 3. These results show that when a surface coating layer was formed in a thickness of 5 µm or more from a resin composition containing a fluororesin and a delustering agent, the surface coating layer had a gloss value of 10 or less (at a light incidence angle of 60°), and a surface printing layer had a gloss value (at a light incidence angle of 60°) higher by 10 or more than the gloss value of the surface coating layer (at a light incidence angle of 60°), not only a gloss-matte effect was exhibited but also a weak tone gradation with a dot area ratio of 20% was sufficiently visible, an excellent tone gradation presenting effect was attained, and novel and good design property was obtained (Examples 1 to 12). It was also shown that when the surface printing layer contained 3 to 23.8% by mass of a lustrous pigment, the tone gradation presenting effect was considerably improved while an excellent gloss-matte effect was maintained (Examples 10 to 12).

When the difference in gloss value (at a light incidence angle of 60°) between the surface printing layer and the surface coating layer was less than 10, a sufficient gloss-matte effect was not obtained, and the tone gradation presenting effect was insufficient (Comparative Examples 3 to 6). When the gloss value of the surface coating layer (at a light incidence angle of 60°) was more than 10, a gloss-matte effect was obtained, but a tone gradation presenting effect was not exhibited even though the difference in gloss value (at a light incidence angle of 60°) between the surface printing layer and the surface coating layer was 10 or more (Comparative Examples 1 and 2).

TABLE 1

| | Surface coating layer | | | | Surface printing layer | |
| | | Delustering agent | | | | Kind of lustrous pigment contained |
| | Resin | Kind Average particle size | Content in surface coating layer (% by mass) | Thickness (μm) | Resin | and content of lustrous pigment in surface printing layer (% by mass) |
|---|---|---|---|---|---|---|
| Example 1 | Fluororesin | Silica particles 1 μm or less | 9.1 | 5 | Fluororesin | — |
| Example 2 | Fluororesin | | 9.1 | 10 | Fluororesin | — |
| Example 3 | Fluororesin | | 9.1 | 20 | Fluororesin | — |
| Example 4 | Fluororesin | | 9.1 | 30 | Fluororesin | — |
| Example 5 | Fluororesin | | 9.1 | 40 | Fluororesin | — |
| Example 6 | Fluororesin | | 8.0 | 20 | Fluororesin | — |
| Example 7 | Fluororesin | Acrylic resin particles 5 μm | 40 | 20 | Fluororesin | — |
| Example 8 | Fluororesin | Silica particles 1 μm or less | 9.1 | 20 | Acrylic resin | — |
| Example 9 | Fluororesin | | 9.1 | 20 | Polyester resin | — |

| | Evaluation results | | | | | | |
| | Surface coating layer | | Surface printing layer | | Difference in gloss value (surface printing layer − surface coating layer) | Gloss-matte effect | Visibility of presented tone gradation |
| | Gloss value | Roughness (Ra) (μm) | Gloss value | Roughness (Ra) (μm) | | | |
|---|---|---|---|---|---|---|---|
| Example 1 | 3 | 0.7 | 17 | 0.8 | 14 | ○ | ○ |
| Example 2 | 4 | 0.7 | 18 | 0.8 | 14 | ○ | ○ |
| Example 3 | 6 | 0.7 | 23 | 0.7 | 17 | ○ | ○ |
| Example 4 | 9 | 0.6 | 26 | 0.6 | 17 | ○ | ○ |
| Example 5 | 10 | 0.6 | 30 | 0.7 | 20 | ○ | ○ |
| Example 6 | 10 | 0.7 | 28 | 0.7 | 18 | ○ | ○ |
| Example 7 | 5 | 1.0 | 16 | 1.0 | 11 | ○ | ○ |
| Example 8 | 6 | 0.7 | 48 | 0.7 | 42 | ⊙ | ○ |
| Example 9 | 6 | 0.6 | 56 | 0.6 | 50 | ⊙ | ○ |

TABLE 2

| | Surface coating layer | | | | | Surface printing layer | |
| | | Delustering agent | | | | Kind of lustrous pigment contained | |
| | Resin | Kind Average particle size | Content in surface coating layer (% by mass) | Thickness (μm) | Resin | and content of lustrous pigment in surface printing layer (% by mass) | |
|---|---|---|---|---|---|---|---|
| Example 10 | Fluororesin | Silica particles 1 μm or less | 9.1 | 20 | Fluororesin | Pearl pigment 3 | |
| Example 11 | Fluororesin | | 9.1 | 20 | Fluororesin | Pearl pigment 13.5 | |
| Example 12 | Fluororesin | | 9.1 | 20 | Fluororesin | Pearl pigment 23.8 | |

TABLE 2-continued

| | Surface coating layer | | Surface printing layer | | Difference in gloss value (surface printing layer − surface coating layer) | Gloss-matte effect | Visibility of presented tone gradation |
|---|---|---|---|---|---|---|---|
| | Gloss value | Roughness (Ra) (μm) | Gloss value | Roughness (Ra) (μm) | | | |
| Example 10 | 6 | 0.7 | 24 | 0.6 | 18 | ○ | ⊙ |
| Example 11 | 6 | 0.8 | 20 | 1.0 | 14 | ○ | ⊙ |
| Example 12 | 6 | 0.6 | 16 | 0.8 | 10 | ○ | ⊙ |

TABLE 3

| | Surface coating layer | | | | | Surface printing layer | |
|---|---|---|---|---|---|---|---|
| | | Delustering agent | | | | | Kind of lustrous pigment contained and content of lustrous pigment in surface printing layer (% by mass) |
| | Resin | Kind | Average particle size | Content in surface coating layer (% by mass) | Thickness (μm) | Resin | |
| Comparative Example 1 | Fluororesin | Silica particles | 1 μm or less | 6.3 | 20 | Fluororesin | — |
| Comparative Example 2 | Fluororesin | | | 7.1 | 20 | Fluororesin | — |
| Comparative Example 3 | Fluororesin | Acrylic resin particles | 10 μm | 40 | 20 | Fluororesin | — |
| Comparative Example 4 | Fluororesin | Acrylic resin particles | 20 μm | 40 | 20 | Fluororesin | — |
| Comparative Example 5 | Fluororesin | Acrylic resin particles | 30 μm | 40 | 20 | Fluororesin | — |
| Comparative Example 6 | Fluororesin | Silica particles | 1 μm or less | 3 | 20 | Fluororesin | Pearl pigment 31.9 |

| | Surface coating layer | | Surface printing layer | | Difference in gloss value (surface printing layer − surface coating layer) | Gloss-matte effect | Visibility of presented tone gradation |
|---|---|---|---|---|---|---|---|
| | Gloss value | Roughness (Ra) (μm) | Gloss value | Roughness (Ra) (μm) | | | |
| Comparative Example 1 | 19 | 0.6 | 36 | 0.6 | 17 | ○ | Δ |
| Comparative Example 2 | 13 | 0.6 | 29 | 0.7 | 16 | ○ | Δ |
| Comparative Example 3 | 2 | 2.4 | 3 | 2.3 | 1 | Δ | X |
| Comparative Example 4 | 1 | 3.6 | 2 | 3.4 | 1 | Δ | X |
| Comparative Example 5 | 2 | 7.8 | 2 | 7.9 | 0 | X | X |
| Comparative Example 6 | 6 | 0.7 | 13 | 0.7 | 7 | Δ | ⊙ |

DESCRIPTION OF REFERENCE SIGNS

1: Heat-resistant substrate
2: Surface coating layer
3: Surface printing layer
4: Primer layer
5: Base coating layer
6: Pattern layer

The invention claimed is:

1. A decorative panel in which at least a surface coating layer and a partially provided surface printing layer are laminated in this order on a heat-resistant substrate, wherein the surface coating layer is formed from a resin composition containing a fluororesin and a delustering agent, and has a thickness of 5 μm or more, and the surface of the surface coating layer has a gloss value of 10 or less (at a light incidence angle of 60°), and the surface of the surface printing layer has a gloss value (at a light incidence angle of 60°) higher by 10 or more than the gloss value of the surface of the surface coating layer (at a light incidence angle of 60°).

2. The decorative panel according to claim 1, wherein the surface of the surface printing layer has a center line average roughness of 1.5 μm or less.

3. The decorative panel according to claim 1, wherein the surface printing layer contains a lustrous pigment.

4. The decorative panel according to claim 1, wherein the content of the lustrous pigment in the surface printing layer is 1.5 to 30% by mass.

5. The decorative panel according to claim 1, wherein the delustering agent comprises inorganic particles.

6. The decorative panel according to claim 1, wherein the delustering agent has an average particle size of 5 μm or less.

7. The decorative panel according to claim 1, wherein the surface of the surface printing layer has a gloss value of 15 or more (at a light incidence angle of 60°).

8. The decorative panel according to claim 1, wherein a colored or transparent base coating layer is provided between the heat-resistant substrate and the surface coating layer.

9. The decorative panel according to claim 1, wherein a pattern layer is provided between the heat-resistant substrate and the surface coating layer.

10. The decorative panel according to claim 8, wherein a pattern layer is provided between the base coating layer and the surface coating layer.

11. The decorative panel according to claim 1, wherein a primer layer is provided between the heat-resistant substrate and the surface coating layer in such a manner that the primer layer is in contact with the heat-resistant substrate.

12. A method for manufacturing a decorative panel, the method comprising the steps of:
   forming a surface coating layer on a heat-resistant substrate using a resin composition containing a fluororesin and a delustering agent, the surface coating layer having a thickness of 5 μm or more and a surface gloss value of 10 or less (at a light incidence angle of 60°); and
   partially forming a surface printing layer on the surface coating layer formed in the foregoing step, the surface printing layer having a surface gloss value (at a light incidence angle of 60°) higher by 10 or more than the surface gloss value of the surface coating layer (at a light incidence angle of 60°).

* * * * *